United States Patent
Mori et al.

(10) Patent No.: US 6,892,774 B2
(45) Date of Patent: May 17, 2005

(54) RADIAL TIRE DERIVED FROM RUBBER COMPOSITION CONTAINING EXPANDABLE GRAPHITE

(75) Inventors: Makio Mori, Hiratsuka (JP); Takeshi Hotaka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 59 days.

(21) Appl. No.: 10/397,173

(22) Filed: Mar. 27, 2003

(65) Prior Publication Data

US 2003/0191249 A1 Oct. 9, 2003

Related U.S. Application Data

(63) Continuation of application No. 09/768,805, filed on Jan. 25, 2002, now abandoned.

(30) Foreign Application Priority Data

Jan. 27, 2000 (JP) .......................... 2002-23349

(51) Int. Cl.[7] .............................. B60C 1/00; C08K 3/04; C08L 9/00
(52) U.S. Cl. ....................... 152/151; 152/525; 524/495; 524/496; 524/525
(58) Field of Search ................................ 152/151, 525; 524/495, 496, 525

(56) References Cited

U.S. PATENT DOCUMENTS

| | | | | |
|---|---|---|---|---|
| 4,722,945 A | * | 2/1988 | Wood et al. | 521/65 |
| 5,760,115 A | * | 6/1998 | Okisaki et al. | 524/261 |
| 6,410,122 B1 | * | 6/2002 | Tono et al. | 428/212 |

FOREIGN PATENT DOCUMENTS

| | | | | |
|---|---|---|---|---|
| JP | 54081518 A | * | 6/1979 | A62C/2/04 |
| JP | 02292344 | | 5/1989 | |
| JP | 08053567 A | * | 2/1996 | C08J/9/32 |
| JP | 11-35736 | | 2/1999 | |
| JP | 11043551 A | * | 2/1999 | C08J/9/14 |
| WO | WO 9831730 | | 7/1998 | |
| WO | WO 9831730 A1 | * | 7/1998 | C08J/5/18 |

* cited by examiner

Primary Examiner—Kelechi C. Egwim
(74) Attorney, Agent, or Firm—Arent Fox, PLLC

(57) ABSTRACT

A rubber composition for a tire comprising 100 parts by weight of diene rubber and 1 to 30 parts by weight of expandable graphite having a particle size of 30 to 600 $\mu$m.

4 Claims, No Drawings

RADIAL TIRE DERIVED FROM RUBBER COMPOSITION CONTAINING EXPANDABLE GRAPHITE

This is a Continuation of application Ser. No. 09/768,805 filed Jan. 25, 2001, now abandoned. The disclosure of the prior application is hereby incorporated by reference herein in its entirety.

BACKGROUND OF THE INVENTION

1. Field of the Invention

The present invention relates to a rubber composition for a tire. More specifically it relates to a rubber composition suitable for use as a tread for a tire, especially a tire for icy and snowy road, having an improved ice traction, while maintaining abrasion resistance, by blending an expandable graphite into a diene rubber, and a manufacturing method of a tire using the same.

2. Description of the Related Art

Numerous studies have been conducted on the technique of blending hard substances, foaming agents, and hollow particulates into rubber to form microirregularities on the surface of the rubber so as to remove the water film formed on the surface of ice and improve the ice traction. However, there is the problem that these methods sometimes cannot result in the desired effects since the additives are brittle by nature and therefore part of the additives is made extremely fine or destroyed after mixing. Further, when mixing powders of these foreign substances to the rubber composition, generally the abrasion resistance of the rubber vulcanizate is remarkably decreased.

For example, examples of the blending of the above hard substances are disclosed in JP-A-60-258235 (i.e., ceramic fine powder), JP-A-2-274740 (i.e., cracked or divided plants), JP-A-2-281052 (i.e., metals). However, according to these methods, there are problems that the hardness of rubber is increased and the flexibilities of the rubber are spoiled, whereby the follow-up property of the tire to road becomes poor. In addition, examples of the above-mentioned hollow particulates are disclosed in JP-A-2-170840, JP-A-2-208336 and JP-A-4-5543. However, according to these methods, the hardness of the rubber is similarly increased or the hollow particles are broken during mixing. On the other hand, JP-A-11-35736 discloses the blending of thermoexpandable microcapsule as a hollow particle capable of improving the ice traction of rubber without increasing the rubber hardness and without being broken by a shearing force during mixing. However, the decrease in the abrasion resistance of the rubber vulcanizate with increase in the compounding amount is inevitable.

SUMMARY OF INVENTION

Accordingly, the objects of the present invention are to provide a rubber composition for a tire having an improved ice traction, while maintaining abrasion resistance and also to provide a method for manufacturing a tire therefrom.

In accordance with the present invention, there is provided a rubber composition for a tire comprising 100 parts by weight of a diene rubber and 1 to 30 parts by weight of an expandable graphite having a particle size of 30 to 600 μm.

In accordance with the present invention, there is also provided a method for manufacturing a pneumatic tire from a rubber composition comprising 100 parts by weight of a diene rubber, 1 to 30 parts by weight of an expandable graphite having a particle size of 30 to 600 μm and curing agents comprising the steps of:

mixing the diene rubber with other ingredients except for the expandable graphite and the curing agents;

adding thereto the expandable graphite and the curing agents in the separate mixing step (i.e., final mixing) under such a condition that the maximum reaching temperature is below the expansion onset temperature of the expandable graphite, followed by extrusion processing under the substantially same temperature condition as in the final mixing; and then assembling a green tire with the extrude of the rubber mixture, and then, vulcanizing the green tire having the extruded rubber mixture as a tire tread at a temperature of more than the expansion onset temperature of the expandable graphite.

DESCRIPTION OF THE PREFERRED EMBODIMENT

The present invention will now be explained in more detail. In this specification and in the claims the singular forms "a", "an" and "the" include plural referents unless the context clearly dictates otherwise.

The expandable graphite is preferably a powdery material containing a substance capable of vaporizing upon heating and having a particle size of 30 to 600 μm, preferably 100 to 350 μm, that is, one which expands to become a expanded graphite body under the heat at the time of vulcanization.

The expandable graphite is composed of sheets formed from graphite structures stacked in layers and can be expanded by vaporization of the substance between the layers to form the expanded graphite. Since the material before the expansion treatment is hard, there is little decrease in the quality thereof due to mixing. Further, since the substance expands irreversibly at a certain temperature, it is possible to easily form foreign substances along with voids inside the rubber matrix during the vulcanization of a tire. This tread portion of the tire using such a rubber acts to form suitable irregularities on the surface at the time of wear so that the water film on the ice surface can be efficiently removed, which results in the improved traction on ice.

On the other hand, the expandable graphite has a good affinity with the rubber matrix or carbon black due to its inherent structure composed of non-polar carbon atoms. There is the advantage that, even if added to rubber, it does not cause a large decrease in the abrasion resistance of the vulcanized rubber on the tire.

The diene rubber usable in the present invention may include any diene rubber used for a tire in the past, for example, natural rubber (NR), polyisoprene rubber (IR), various styrene-butadiene copolymer rubbers (SBR), various butadiene rubbers (BR), acrylonitrile-butadiene copolymer rubber, etc. These may be used alone or in any blends thereof.

In the present invention, 1 to 30 parts by weight, preferably 5 to 15 parts by weight, of expandable graphite are blended into 100 parts by weight of a diene rubber. If the amount blended is too small, the desired effect cannot be obtained, while conversely if it is too large, the ice traction is unpreferably decreased due to the decrease in the micro-level contact between the rubber surface and the iced surface of the road, and also the mechanical strength and the abrasion resistance of the rubber vulcanizate is unpreferably decreased.

In the present invention, preferably it is possible to further include 1 to 20 parts by weight, preferably 5 to 10 parts by weight, based upon 100 parts by weight of the diene rubber, of heat expandable thermoplastic resin particles containing therein a liquid or solid capable of generating a gas upon vaporization, decomposition, or a chemical reaction under heating.

The heat expandable thermoplastic resin particles contain therein a liquid or solid which vaporizes, decomposes, or chemically reacts under heat to generate a gas in a thermoplastic resin. These heat expandable thermoplastic resin particles are heated to expand at a temperature above the temperature of start of expansion, normally a temperature of 140 to 190° C. The gas is sealed inside a shell comprised of the thermoplastic resin. Therefore, the size of the gas-encompassed thermoplastic resin particles is preferably 5 to 300 $\mu$m, more preferably 10 to 200 $\mu$m before expansion.

Examples of such heat expandable thermoplastic resin particles (unexpanded particles) are commercially available as the current "Expancel 091 DU-80" or "Expancel 092 DU-120" etc. from Sweden's EXPANCEL Co. or "Matsumoto Microsphere F-85" or "Matsumoto Microsphere F-100" from Matsumoto Yushi-Seiyaku Co.

The preferable thermoplastic resin comprising the outer shell of the gas-encompassed thermoplastic resin particles are, for example, those having a temperature of start of expansion of at least 100° C., preferably at least 120° C., and a maximum temperature of expansion of at least 150° C., preferably at least 160° C. Examples of such a thermoplastic resin are a (meth)acrylonitrile polymer or a copolymer having a high content of (meth)acrylonitrile. As the other monomer (i.e., comonomer) in the case of a copolymer, a halogenated vinyl, halogenated vinylidene, styrene based monomer, (meth)acrylate based monomer, vinyl acetate, butadiene, vinyl pyridine, chloroprene, or other monomer may be used. Note that the above-mentioned thermoplastic resin may be cross-linked by a cross-linking agent such as divinylbenzene, ethylene glycol di(meth)acrylate, triethylene glycol di(meth)acrylate, trimethylolpropane tri(meth)acrylate, 1,3-butylene glycol di(meth)acrylate, ary(meth)acrylate, triacrylformal, and triarylisocyanulate. For the cross-linking mode, noncross-linking condition is preferable, but partial cross-linking to an extent not detracting from the properties as the thermoplastic resin is also possible.

Examples of the liquid or solid capable of generating a gas by vaporization, decomposition, or chemical reaction under heat are hydrocarbons such as n-pentane, isopentane, neopentane, butane, isobutane, hexane, and petroleum ether, liquids such as a chlorinated hydrocarbon, e.g., methyl chloride, methylene chloride, dichloroethylene, trichloroethane, and trichloroethylene, or solids such as azodicarbonamide, dinitrosopentamethylene-tetramine, azobisisobutyronitrile, toluenesulfonyl hydrazide derivative, or aromatic succinyl hydrazide.

The expandable graphite per se is an already known material and produced by a known method. Generally speaking, graphite particles are immersed in a mixture of a strong acid substance and an oxidizing agent, followed by an intercalation treatment to insert the acid between layers of the graphite particles to provide the expandability on the graphite. For example, conc. sulfuric acid is used as the strong acid substance and nitric acid is used as the oxidizing agent, whereby the expandable graphite having sulfuric acid between the layers of the graphite particle is obtained. The expandable graphite is expanded by vaporizing the interlayer compound to thereby open the interlayer to be expanded. Typical expandable graphite containing sulfuric acid anhydride as a vaporizable interlayer component has an onset expansion temperature of around 300° C. By the modification of the interlayer component and by the use of, or the combined use with, other low boiling point acidic substance (e.g., nitric acid), the expandable graphite having an expansion initiating temperature of 300° C. or less is manufactured and sold in the market. The processing temperature of the rubber composition containing the diene rubber is typically 200° C. or less, according to the present invention, and the intended effects of the present invention can be obtained by the use of the expandable graphite having an expansion initiating temperature of 190° C. or less.

Examples of such an expandable graphite having an expansion initiating temperature of 190° C. or less are "GRAFGuard 160-50" or "GRAFGuard 160-80" produced by UCAR Graphtech (USA) and available from Tomoe Engineering Co. (Japan), both of which have an onset expansion temp. of around 160° C.

In the present invention, the expandable graphite is desirably expanded neither in the mixing nor extrusion steps of the rubber composition, but in the vulcanization step and those having an expansion initiating temperature of 120 to 190° C., preferably 140 to 170° C. If the expansion initiating temperature is less than 120° C., the expandable graphite is unpreferably expanded at the mixing step or extrusion step, whereby the specific density of the rubber is fluctuated during these steps and the processability is seriously impaired.

Contrary to this, if the expansion initiating temperature is more than 190° C., the processing temperature in the vulcanization step should be fitted at a temperature of more than 190° C., in which the molecules of the diene rubber, the main component of the rubber composition, tend to be remarkably deteriorated.

The rubber composition of the present invention may contain therein any carbon black which is usually blended into a rubber composition as a rubber reinforcing filler. Further, it is possible to use carbon black treated on its surface with silica. Further, it is also possible to use unhydrated or precipitated silica per se. The amount of the carbon black blended is 20 to 80 parts by weight, preferably 30 to 60 parts by weight, based upon 100 parts by weight of the rubber component. If the amount blended is too small, the rubber cannot be sufficiently reinforced, and therefore, the abrasion resistance is unpreferably decreased, for example. Conversely, if too large, the hardness becomes too high and the processability becomes poorer. Further, unhydrated or precipitated silica is blended in an amount of 0 to 50 parts by weight, preferably 0 to 20 parts by weight, based upon 100 parts by weight of the rubber component. The silica does not have to be used, but if used, it should be used in a certain amount where the viscoelastic property of the rubber vulcanizate, such as tan $\delta$, is improved. If the amount of silica is too large, the electrical conductivity is unpreferably decreased, the agglomeration of the reinforcing filler becomes larger so that the dispersion during the mixing becomes unpreferably insufficient.

The carbon black used in the present invention preferably has a specific area of nitrogen adsorption ($N_2SA$) of at least 70 $m^2/g$, more preferably 80 to 200 $m^2/g$, and a dibutyl phthalate oil absorption (DBP) of preferably at least 95 ml/100 g, more preferably 105 to 140 ml/100 g.

According to the present invention, a pneumatic tire can be manufactured from the above-mentioned rubber composition for a tire containing 100 parts by weight of a diene rubber, 1 to 30 parts by weight, preferably 5 to 15 parts by weight, of an expandable graphite having a particle size of 30 to 600 μm, preferably 100 to 350 μm and a curing agents (e.g., sulfur and optionally a cure accelerator).

First, the diene rubber is mixed with other ingredients generally used in the rubber compounding for a tire, other than the expandable graphite and the curing agents by means of, for example, Banbury mixer, followed by adding, at a separate mixing step called final mixing, thereto the expandable graphite and the curing agents. The final mixing must be performed under such a condition that the maximum reaching temperature during the mixing is less than, preferably by 20° C. or more less than, the expansion initiating temperature of the expandable graphite, followed by extrusion processing under the similar temperature condition of the above final mixing. Thereafter, the extruded tread part composed of rubber mixture is assembled and then vulcanized in a curing press at a temperature of higher than, preferably by 10° C. or more higher than, the expansion initiating temperature of the expandable graphite. If the temperature of the mixing steps or the extrusion step reach the expansion initiating temperature or more, the expandability at the vulcanization step unpreferably becomes insufficient or the expandable graphite expanded at the mixing or extrusion step is unpreferably broken or deformed (or distorted) in the extrusion or vulcanization step. Furthermore, if the temperatures at the mixing or extrusion step reaches a temperature of, or higher than, the expansion initiating temperature, the specific gravity of the rubber composition is undesirably changed during the processing by the expansion of the expandable graphite inside the rubber mixture and therefore the processability is unpreferably impaired.

The rubber composition for a tire according to the present invention may contain therein various additives generally used for rubber compositions such as a vulcanization or cross-linking agent, a vulcanization or cross-linking accelerator, various oils, an antioxidant, a filler, a plasticizer, etc. The composition may be mixed and vulcanized to form a composition which has an improved ice traction. The amount of these additives added may be the general amounts used in the past so long as the object of the present invention is not impaired.

EXAMPLES

The present invention will now be further explained with reference to Examples and Comparative Examples, but the present invention is of course not limited in scope by these Examples.

Comparative Examples 1 to 2 and Examples 1 to 4

Preparation of Samples

Rubber and compounding agents such as carbon black were mixed for five minutes using a 1.7 liter closed Banbury mixer based upon the formulations (parts by weight) shown in Table I, then blended with a vulcanization promoter, sulfur, microcapsules, and expandable graphite by an open roll.

Next, the composition was press vulcanized in a 15×15×0.2 cm mold at 175° C. for 10 minutes to prepare test pieces (i.e., rubber sheets). These vulcanization test pieces were evaluated for physical properties such as the ice traction on ice (−1.5° C. and −3° C.) and abrasion resistance. The results are shown in Table II.

Test Methods

Measurement of Traction on Ice

Sheets composed of the various components were attached to a flat columnar shaped rubber base and measured for the coefficient of ice traction by an inside-drum type ice traction tester. The measurements are performed at a temperatures of −3.0° C. and −1.5° C., the load was 5.5 kg/cm$^3$, and the drum rotational speed was 25 km/h.

Measurement of Abrasion Resistance

A Lambourne abrasion tester (manufactured by Iwamoto Seisakusho) was used to measure the abrasion resistance under a load of 5 kg, a slip rate of 25%, a time of 4 minutes, and room temperature. The amount of abrasion loss for the test sample obtained from the amount of loss by abrasion was compared with the one for the standard sample (#1) and then the performance of the abrasion resistance was indicated by an index.

TABLE I

|  | Comparative Example | | Example | | | |
|---|---|---|---|---|---|---|
|  | 1 | 2 | 1 | 2 | 3 | 4 |
| Natural rubber RSS#3 | 50 | 50 | 50 | 50 | 50 | 50 |
| Nipol 1220*1 | 50 | 50 | 50 | 50 | 50 | 50 |
| Shoblack N220*2 | 55 | 55 | 55 | 55 | 55 | 55 |
| Santoflex 6PPD*3 | 1 | 1 | 1 | 1 | 1 | 1 |
| Zinc oxide #3*4 | 3 | 3 | 3 | 3 | 3 | 3 |
| Stearic acid*5 | 1 | 1 | 1 | 1 | 1 | 1 |
| Aromatic oil*6 | 30 | 30 | 30 | 30 | 30 | 30 |
| Santocure NS*7 | 1.5 | 1.5 | 1.5 | 1.5 | 1.5 | 1.5 |
| Sulfur*8 | 2 | 2 | 2 | 2 | 2 | 2 |
| Microsphere-F100D*9 | — | 10 | — | 10 | — | 10 |
| GRAFGuard 160-50N*10 | — | — | 10 | 10 | — | — |
| GRAFGuard 160-80N*11 | — | — | — | — | 10 | 10 |

*1Nipol 1220: BR manufactured by Nippon Zeon, glass transition temperature = −101° C.
*2Shoblack N220: Carbon black manufactured by Showa Cabot (N$_2$SA: 111 m$^2$/g, DBP oil absorption: 111 ml/100 g)
*3Santoflex 6PPD: Antioxidant manufactured by Flexsis
*4Zinc oxide #3: manufactured by Seido Chemical Industry
*5Stearic acid: manufactured by NOC
*6Aromatic oil: manufactured by Fuji Kosan
*7Santocure NS: Vulcanization accelerator manufactured by Flexsis
*8Sulfur: manufactured by Karuizawa Refinery
*9Microsphere F100D: Expandable microcapsule manufactured by Matsumoto Yushi
*10GRAFGuard 160-50N: Expandable graphite manufactured by UCAR (marketed by Tomoe Kogyo), Ave. particle size = 300 μm, expansion onset temperature = 160° C.
*11GRAFGuard 160-80N: Expandable graphite manufactured by UCAR (marketed from Tomoe Kogyo), Ave. particle size = 177 μm, expansion onset temperature = 160° C.

TABLE II

|  | Comparative Example | | Example | | | |
|---|---|---|---|---|---|---|
|  | 1 | 2 | 1 | 2 | 3 | 4 |
| Traction on ice (index)*12 (−3.0° C.) | 100 | 133 | 138 | 162 | 135 | 155 |
| Traction on ice (index)*12 (−1.5° C.) | 100 | 146 | 150 | 181 | 140 | 187 |
| Abrasion performance*12 (index) | 100 | 87 | 105 | 90 | 101 | 92 |

*12The index based upon the value of Comparative Example 1.

The higher the value, the higher the traction on ice or the abrasion resistance exhibited.

Comparative Examples 3 to 7 and Examples 5 to 12

Preparation of Samples

Rubber and compounding agents such as carbon black were mixed for five minutes using a 1.7 liter closed Banbury mixer based upon the formulations (parts by weight) shown in Table III, then blended with a vulcanization accelerator, sulfur, nylon fine particles, silas balloon, microcapsules, and expandable graphite by an open roll.

Next, the composition was press vulcanized in a 15×15× 0.2 cm mold at 175° C. for 10 minutes to prepare test pieces (i.e., rubber sheets). These test pieces were evaluated for vulcanized physical properties such as the ice traction on ice (−1.5° C. and −3° C.) and abrasion resistance. The results are shown in Table III, according to the above-mentioned methods.

Since the tests in Table II and Table III were not carried out at the same time, the absolute values shown in Tables II and III are not always the same due to the minor differences in the test condition and/or the experimental errors. Especially, a variation in the dielectric constant of the water used for the preparation of ice in the ice traction tester may give the large deviation on the test results. Nevertheless, the relative order of the performance in the same test is always true.

As explained above, according to the present invention, by blending into a diene rubber an expandable graphite and in some cases a heat expandable thermoplastic resin, it is possible to achieve a remarkable balance between the improved ice traction and the adequate abrasion resistance of the vulcanized rubber.

What is claimed is:

1. A radial tire suitable for icy and snowy roads, comprising a radial tire derived from a rubber composition comprising 100 parts by weight of a diene rubber and 1 to 30 parts by weight of an expandable graphite having a particle size of 30 to 600 μm, said expandable graphite being expanded in the radial tire.

2. A radial tire as claimed in claim 1, wherein said rubber composition further comprising 1 to 20 parts by weight, based upon 100 parts by weight of the diene rubber, of a microcapsule capable of being expanded to form a gas-encompassed thermoplastic resin upon heating, said microcapsule being expanded in the radial tire.

3. A radial tire as claimed in claim 1, wherein said rubber composition further contains 20 to 80 parts by weight of a carbon black having a specific surface area of nitrogen adsorption ($N_2SA$) of not less than 70 $m^2/g$ and a dibutyl phthalate (DBP) oil absorption of not less than 105 ml/100 g and 0 to 50 parts by weight of unhydrated or precipitated silica, based upon 100 parts by weight of the rubber.

4. A method for manufacturing the tire of claim 1, from a rubber composition comprising 100 parts by weight of a diene rubber, 1 to 30 parts by weight of an expandable

TABLE III

| | Comparative Example | | | | | | Example | | | | | | | |
|---|---|---|---|---|---|---|---|---|---|---|---|---|---|---|
| | 1 | 3 | 4 | 5 | 6 | 7 | 5 | 6 | 7 | 8 | 9 | 10 | 11 | 12 |
| Natural rubber RSS#3 | 50 | 50 | 50 | 50 | 50 | 50 | 50 | 50 | 50 | 50 | 50 | 50 | 50 | 50 |
| Nipol 1220*1 | 50 | 50 | 50 | 50 | 50 | 50 | 50 | 50 | 50 | 50 | 50 | 50 | 50 | 50 |
| Shoblack N220*1 | 55 | 55 | 55 | 55 | 55 | 55 | 55 | 55 | 55 | 55 | 55 | 55 | 55 | 55 |
| Santoflex 6PPD*1 | 1 | 1 | 1 | 1 | 1 | 1 | 1 | 1 | 1 | 1 | 1 | 1 | 1 | 1 |
| Zinc oxide #3*1 | 3 | 3 | 3 | 3 | 3 | 3 | 3 | 3 | 3 | 3 | 3 | 3 | 3 | 3 |
| Stearic acid*1 | 1 | 1 | 1 | 1 | 1 | 1 | 1 | 1 | 1 | 1 | 1 | 1 | 1 | 1 |
| Aromatic oil*1 | 30 | 30 | 30 | 30 | 30 | 30 | 30 | 30 | 30 | 30 | 30 | 30 | 30 | 30 |
| Santocure NS*1 | 1.5 | 1.5 | 1.5 | 1.5 | 1.5 | 1.5 | 1.5 | 1.5 | 1.5 | 1.5 | 1.5 | 1.5 | 1.5 | 1.5 |
| Sulfur*1 | 2 | 2 | 2 | 2 | 2 | 2 | 2 | 2 | 2 | 2 | 2 | 2 | 2 | 2 |
| Nylon fine particle*2 | — | 5 | — | — | — | — | — | — | — | — | — | — | — | — |
| Silas balloon*3 | — | — | 5 | — | — | — | — | — | — | — | — | — | — | — |
| Microsphere*4 | — | — | — | 1 | 10 | 20 | — | — | — | — | — | 1 | 10 | 20 |
| GG50N*5 | — | — | — | — | — | — | 1 | 5 | 10 | 20 | 30 | 5 | 5 | 5 |
| Traction on ice (index)*6 (−3.0° C.) | 100 | 92 | 100 | 104 | 130 | 145 | 104 | 118 | 132 | 148 | 137 | 123 | 141 | 155 |
| Traction on ice (index)*7 (−1.5° C.) | 100 | 101 | 103 | 107 | 142 | 164 | 107 | 131 | 150 | 170 | 160 | 135 | 167 | 195 |
| Abrasion performance*8 (index) | 100 | 72 | 74 | 98 | 86 | 69 | 100 | 103 | 101 | 92 | 80 | 99 | 95 | 70 |

Note 1: Comparative Example 6 in Table III and Comparative Example 2 in Table I as well as Example 7 in Table III and Example 1 in Table I have the same compounding formulation, but the tests were not carried out at the same time.
Note 2: Both the traction on ice and the abrasion performance are indicated by an index based upon the results of Comparative Example 1.
Footnote of Table III
*1See Footnote of Table I above
*2Nylon fine particle (Amivan available from Toray)
*3Silas balloon available from Silas Co.
*4Microsphere F100D (Heat expandable microcapsule available from Matsumoto Yushi K.K.)
*5GRAFGuard 160-50N (Expandable graphite manufactured by UCAR Graphtech, available from Tomoe Engineering Co. Ltd., average particle size = 300 μm, expansion initiating temperature = 160° C.)
*6−3° C.μ, inside drum-type ice-traction tester at −3° C., which represents such a condition that the relatively stiff ice
*7−1.5° C.μ, inside drum-type ice-traction tester at −1.5° C., which represents such a condition that the ice is relatively easy to melt and rubber is easy to slip thereon.
*8One roter type Lambourne abrasion test result.

graphite having a particle size of 30 to 600 μm and curing agents comprising the steps of:

mixing the diene rubber with other components except for the expandable graphite and the curing agents;

adding thereto the expandable graphite and the curing agents in a separate mixing step under such a condition that the maximum reaching temperature is below expansion onset temperature of the expandable graphite, followed by extrusion processing under a substantially same temperature condition as in the separate mixing; and then assembling a green tire with extrude of the rubber mixture, and then, vulcanizing the green tire having the extruded rubber mixture at a temperature of more than the expansion onset temperature of the expandable graphite, whereby the expandable graphite is expanded in a vulcanized tire.

* * * * *